(12) United States Patent
Oliver, III

(10) Patent No.: US 7,478,904 B2
(45) Date of Patent: Jan. 20, 2009

(54) THREE DIMENSIONAL VIEWING SPECTACLES

(76) Inventor: Robert Grant Oliver, III, 141 Ransone St., Hampton, VA (US) 23669

( * ) Notice: Subject to any disclaimer, the term of this patent is extended or adjusted under 35 U.S.C. 154(b) by 26 days.

(21) Appl. No.: 11/655,095

(22) Filed: Jan. 19, 2007

(65) Prior Publication Data

US 2008/0174866 A1 Jul. 24, 2008

(51) Int. Cl.
*G02C 7/16* (2006.01)
(52) U.S. Cl. .............................. 351/45; 351/46; 351/41
(58) Field of Classification Search .................. 351/44, 351/45, 46, 49, 41, 158, 159; 359/478, 462, 359/464, 888
See application file for complete search history.

(56) References Cited

U.S. PATENT DOCUMENTS

| 4,508,526 | A | * | 4/1985 | Dutcher | 493/346 |
| 4,893,898 | A | * | 1/1990 | Beard | 359/464 |
| 5,559,632 | A | * | 9/1996 | Lawrence et al. | 359/478 |
| 5,631,717 | A | * | 5/1997 | Spector | 351/44 |

* cited by examiner

*Primary Examiner*—Hung X Dang
(74) *Attorney, Agent, or Firm*—Jerome J. Norris

(57) ABSTRACT

In combination, a pair of lens and eyeglass frame to give a viewer perception of three dimensional viewing of a two dimensional image, comprising: an opaque eyeglass frame containing a left lens and a right lens, in which the left lens is comprised of alternating tinted and clear apertures, and the right lens is composed of alternating tinted apertures complementary to the alternating clear apertures in the left lens.

8 Claims, 5 Drawing Sheets

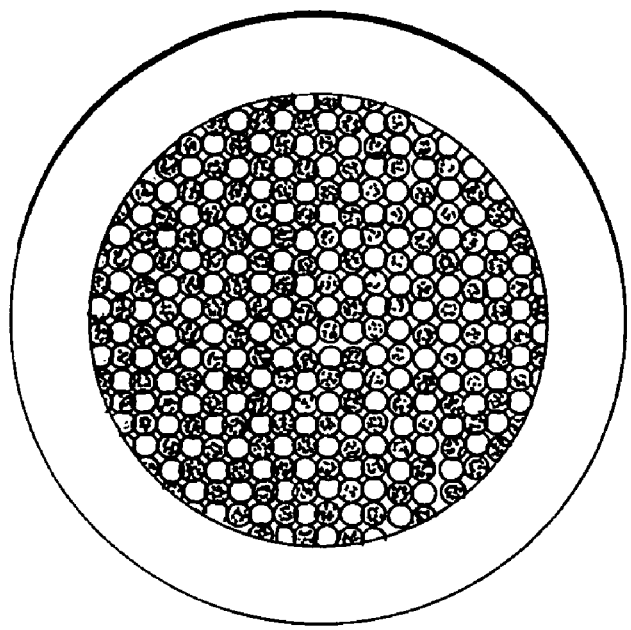
F I G. 2D
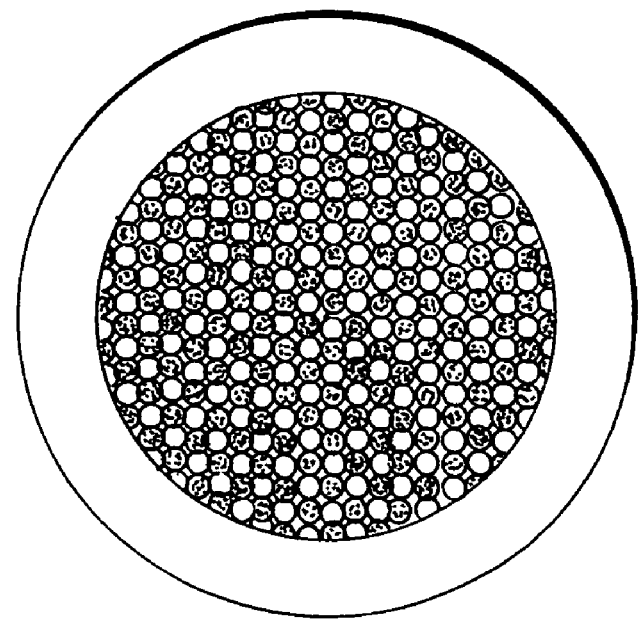
F I G. 2C

THREE DIMENSIONAL VIEWING SPECTACLES

BACKGROUND OF THE INVENTION

I. Field of the Invention

The present invention relates to spectacles that enable two-dimension images from television, motion pictures, video games and the like to be viewed in three-dimension.

II. Description of the Related Art

Many techniques have been used to provide (three-dimensional) images for one viewing motion pictures or television. One technique requires two camera systems in which two different pictures are taken from different camera angles and locations, with the objective of simulating how depth is perceived by a pair of human eyes, which are offset from each other and thereby able to view images at slightly different angles. These two camera images are superimposed and then presented to the viewer simultaneously on a television or movie screen. Thereafter, the images are separated for the viewer so that one eye sees only one image, and the other eye sees only the other image, to provide the illusion of depth created by simulating normal vision.

Another technique uses color filters to separate the two images. The images are color coded, as for example with red and green, and the viewer is given glasses having different colored filters in front of each eye, and each filter rejects the image not intended for that eye, and transmits the image intended to be seen by that eye. For example, a red color filter will pass only the red image, and a green color filter will pass only the green image to enable the viewer to experience a 3-D image.

A further technique for providing three-dimensional images is through the use of viewing glasses for stereoscopic pictures, wherein two lens of the viewing glasses are polarized, with one of the lens having a polarizing plane lying at an angle different than the polarizing plane of the other lens and a polarizing image projected onto a screen enables the viewer to see a proper image transmitted to each eye; however, this technique requires special non-depolarizing projection screens.

A yet further technique to enable a viewer to experience three-dimensional or stereoscopic pictures utilizes viewing glasses based upon what is referred to as the Pulfrich effect, wherein an image is viewed through a pair of glasses having a dark right-eye lens and a light left-eye lens, so that an object moving from left to right in an image is viewed as a three-dimensional image. Conversely, a two-dimensional image viewed thru a pair of glasses having a dark left-eye lens and a light right-eye lens wherein the object is moving from right to left in a two-dimensional image is viewed as a three-dimensional image.

There is an interest when viewing two dimensional images from television sets or movies to provide better means to allow the viewer to appear to see these images in three dimensions, by the use of an inexpensive frame and inexpensive lenses to enable viewing that would not require manipulation of different color coding to the objects or the use of specialized projecting cameras that enable the viewer to experience an image taken from two or more cameras.

SUMMARY OF THE INVENTION

One object of the present invention is to provide a lens and eyeglass frame to enable a viewer to utilize this combination to see in three dimension, a two dimensional image.

Another object of the present invention is to provide a lens and eyeglass frame to enable a viewer to utilize this combination so as to perceive a "jump out" effect that gives the illusion of a three dimensional or stereoscopic view of a two-dimensional image.

A further object of the present invention is to provide a lens and eyeglass frame to enable a viewer to utilize this combination so as to perceive a "window" effect that gives the illusion of a three dimensional or stereoscopic view of a two-dimensional image.

These and other objects of the invention will become more apparent by reference to the Brief Description. Of the Drawings and Detailed Description of the Preferred Embodiments of the Invention.

DETAILED DESCRIPTION OF PREFERRED EMBODIMENT OF THE INVENTION

Figure 1:
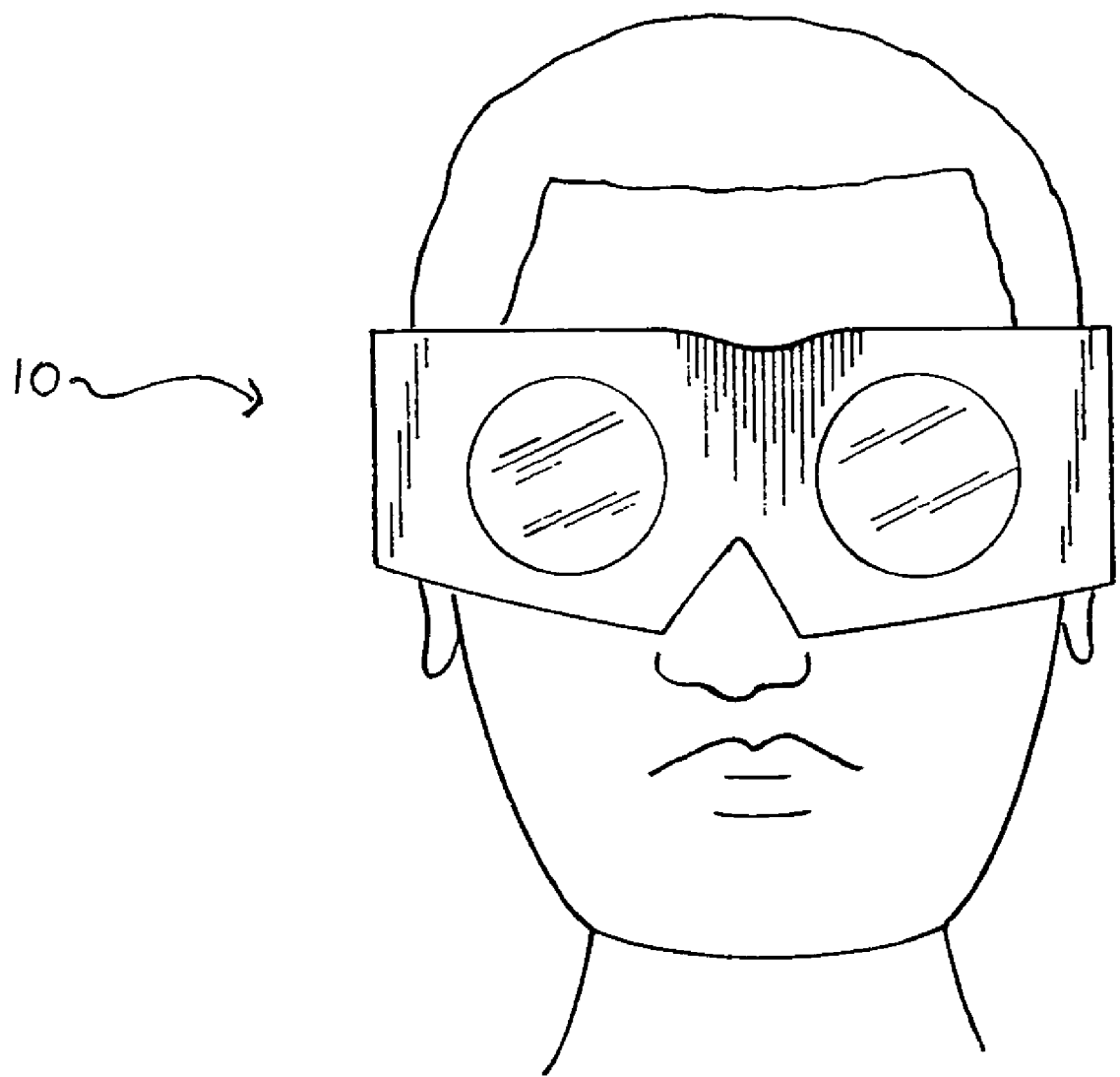
FIG. 1 is a perspective view of the eyeglass frame and lens (on a viewer) that enable the viewer to perceive a three-dimensional image from a two-dimensional image.
Figure 2B:
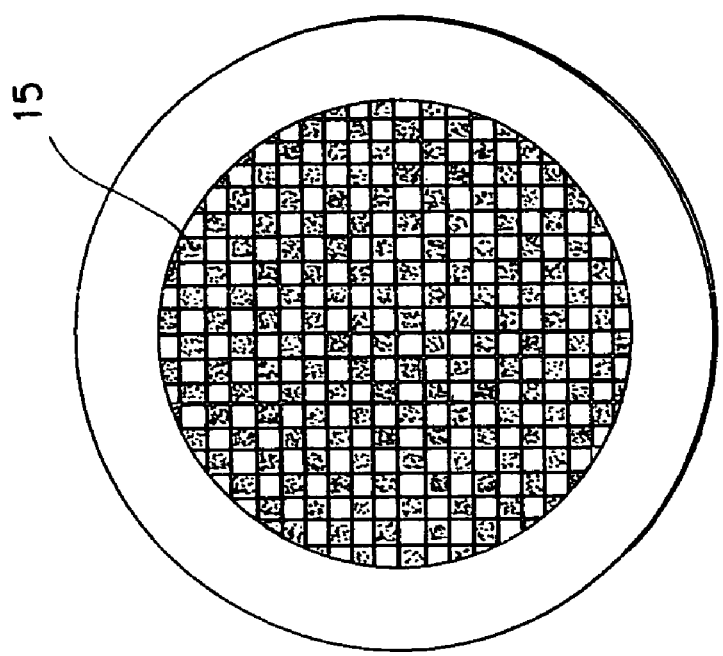
FIG. 2 is a front view of the lens in the eyeglass frame of FIG. 1 depicting alternating clear and tinted squares or apertures in the left lens and alternating clear and tinted squares or apertures in the right lens, and wherein the tinted alternation in the left lens is complementary to the clear alternation in the right lens, to provide the appearance of stereoscopic viewing of a two-dimensional image.
FIGS. 2C and 2D show alternating tinted and clear apertures that are round shaped.
FIGS. 2E and 2F show alternating tinted and clear apertures that are diamond shaped.
Figure 2A:
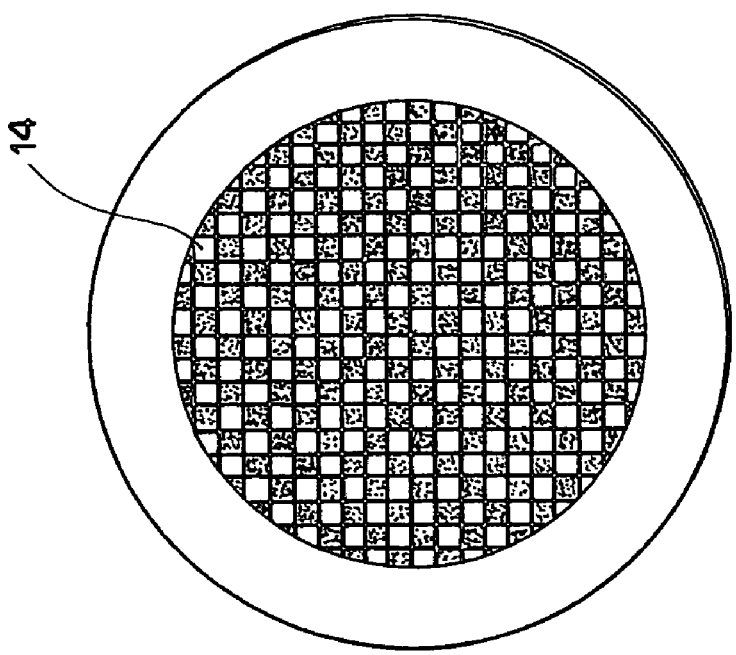
Figure 2F:
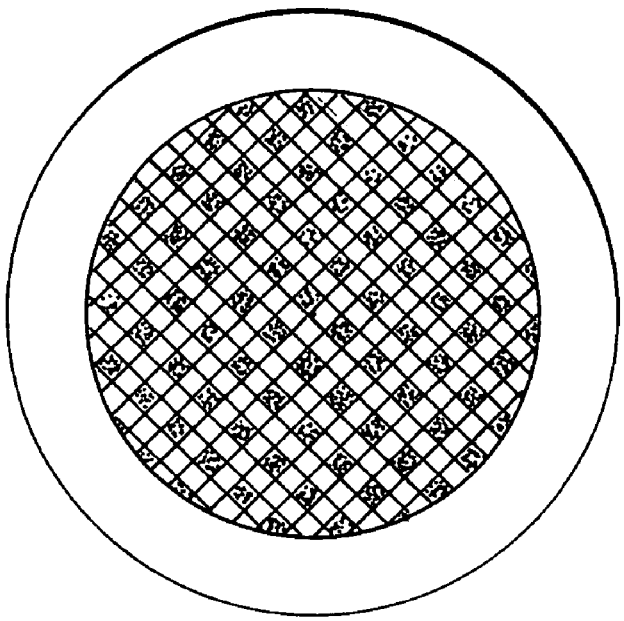
Figure 2E:
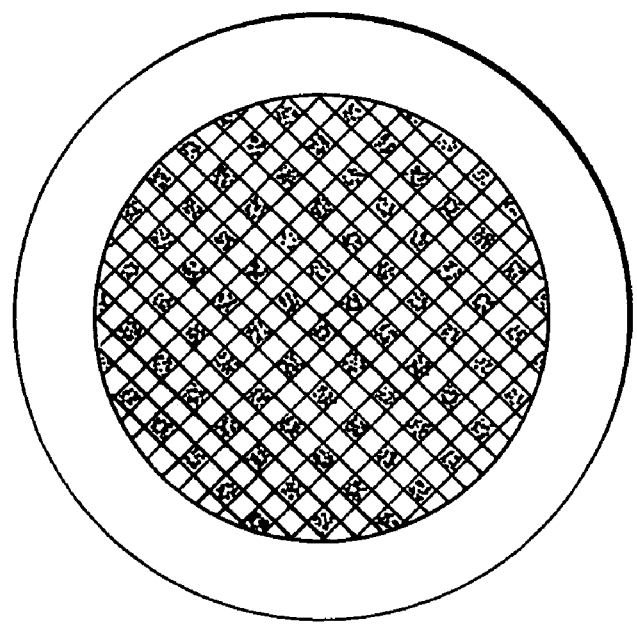

Reference is now made to FIG. 1, which depicts the eyeglass frame and lens on a viewer. In this view, the eyeglass frame 10 is shown as a rectangular frame; however, the frame may be of any configuration as long as it is opaque throughout, except for the lenses itself.

Figure 3:
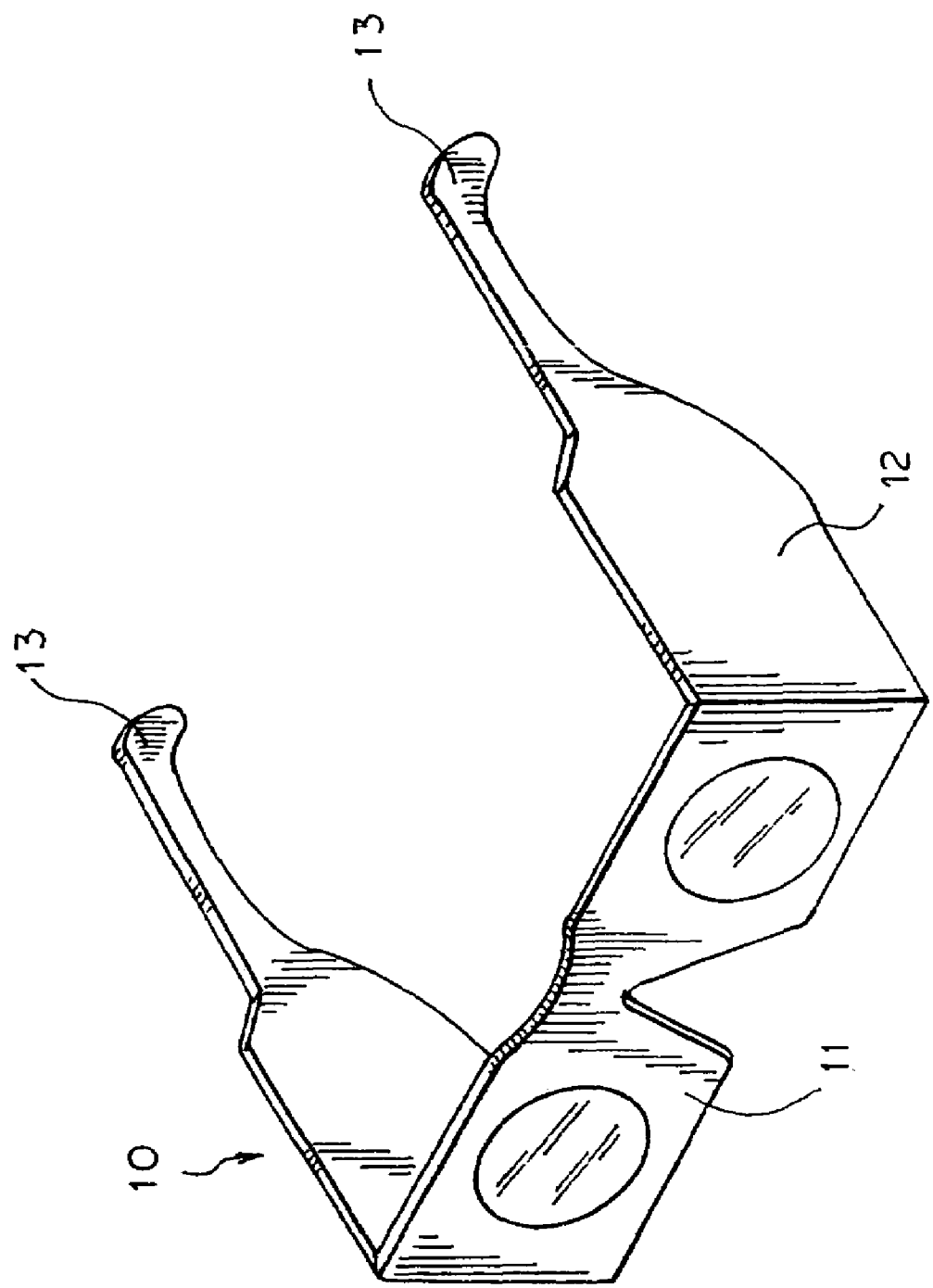
FIG. 3 is a front perspective view of the eyeglasses showing the opaque frame used to mask the left and right hand side of a TV or movie to enhance the sensation of depth perception and simulation when looking through the alternately disposed clear and tinted areas complementary in the right and left lens.

The opaque frame is also opaque in its temples (left and right) to enable it to mask side borders of a TV or movie screen so as to augment or enhance the lenses itself, and towards this end, it will be noted that in FIG. 3, the bridge portion of the frame 11 as well as the temple portion 12 and the curved ear portions 13 which rest over the ears are also opaque—thereby allowing the viewer to observe a TV screen or movie in a tunnel-like manner.

The lenses depicted in FIG. 2 are characterized by alternating clear and tinted squares, so that a tinted square in the left lens has a complementary clear or untinted square lens in the right lens.

This configuration of the alternating tinted and clear squares so that tinted squares in the left lens has a complementary of untinted squares in the right lens accomplishes the effect of delaying the processing of the image observed by the eye through the tinted square portions of the lens and results in the eye seeing the image as it was for a smaller period of time before the lighter image perceived by that portion of the eye observing through the untinted or clear square. The perception of a completely real three-dimensional effect is obtained, as there is a lag between the image reaching the eye from the tinted squares compared to the image reaching the eyes from the clear squares.

From FIG. 2, it can be seen that the clear squares 14 are complementary to the tinted squares 15, and the delay in time of observation of the image coupled with the opaque eyeglass frame that affords tunnel-like viewing of a television or movie screen attributes a synergistic effect that enhances the three-dimensional perception of a two-dimensional object.

It should be understood from the foregoing that variations of the invention are encompassed, and these variations and changes in form and detail can be made by those skilled in the art without departing from the scope of the invention, which is set forth in the appended claims, as follows:

We claim:

1. In combination, a pair of lens and eyeglass frame to give a viewer perception of three dimensional viewing of a two dimensional image, comprising:

an opaque eyeglass frame containing a left lens and a right lens, wherein said left lens is comprised of alternating tinted and clear apertures, and said right lens is comprised of alternating tinted apertures complementary to the alternating clear apertures in the left lens.

2. The combination of claim 1 wherein said alternating tinted and clear apertures are round shaped.

3. The combination of claim 1 wherein said alternating tinted and clear apertures are diamond shaped.

4. The combination of claim 1 wherein said alternating tinted and clear apertures are square shaped.

5. The combination of claim 1 wherein said opaque eyeglass frame is black.

6. The combination of claim 5 wherein said alternating tinted and clear apertures are round shaped.

7. The combination of claim 5 wherein said alternating tinted and clear apertures are diamond shaped.

8. The combination of claim 5 wherein said alternating tinted and clear apertures are square shaped.

* * * * *